Patented Jan. 17, 1928.

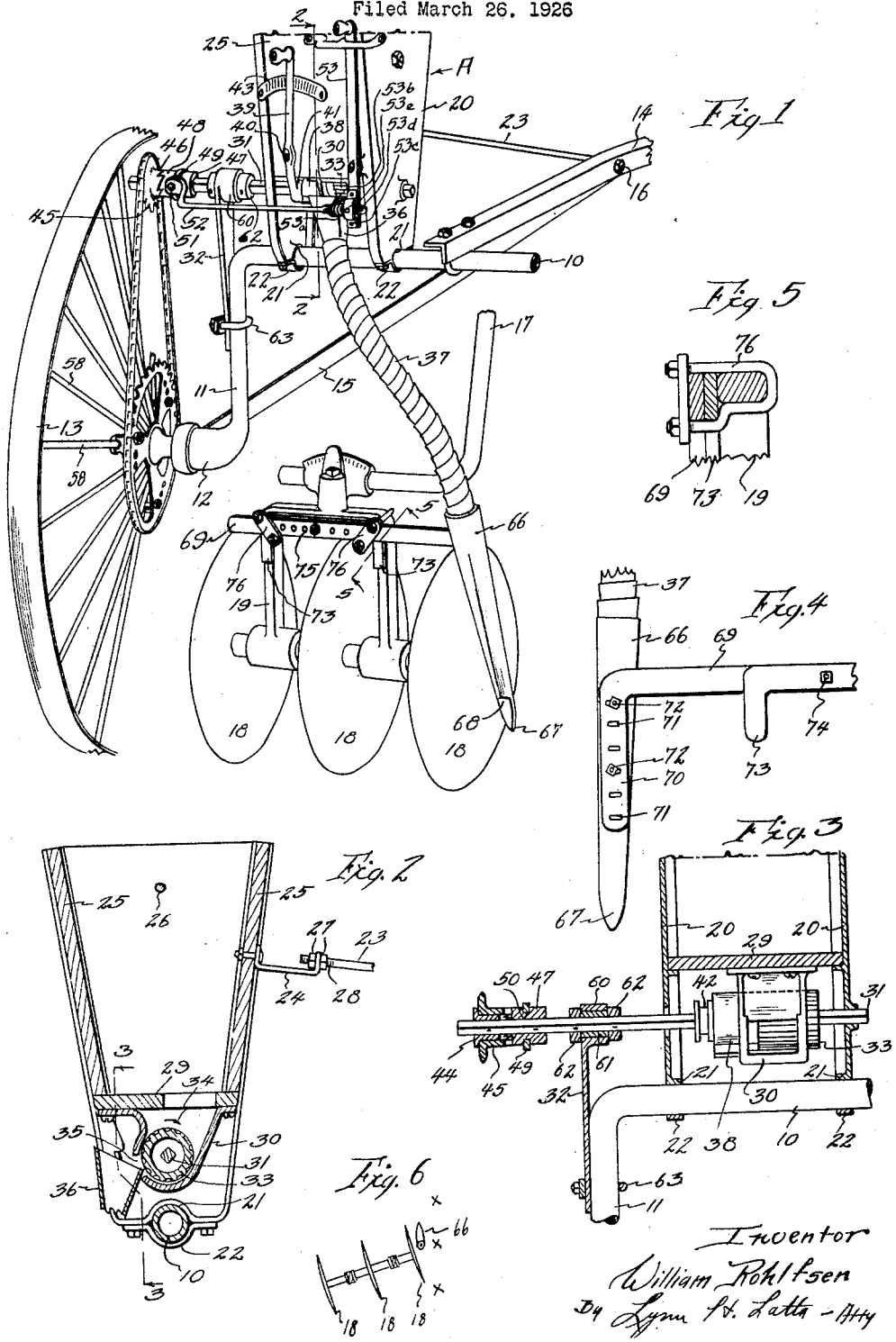

1,656,831

UNITED STATES PATENT OFFICE.

WILLIAM ROHLFSEN, OF PAULLINA, IOWA.

SEEDING ATTACHMENT FOR CULTIVATORS.

Application filed March 26, 1926. Serial No. 97,576.

My invention relates to a seeding attachment for cultivators, particularly an attachment which may be used to drill a crop of forage plants directly in the rows of the plants of the partially matured crop such as corn, such drilling being done simultaneously with the cultivating operation.

An object of my invention is to provide such an attachment which is of simple, durable and inexpensive construction and which may be applied to the ordinary cultivator frame without the necessity of drilling holes in the frame, and with a minimum amount of time and labor.

A further object of my invention is to provide such a seeding attachment which is driven by a chain and sprocket connection with the wheel of the cultivator, the operating shaft of the seeding attachment being supported partially in the hopper thereof and partially by a vertically adjustable bracket, which also serves, by vertical adjustment, to tighten the chain.

More particularly, it is my object to provide a seeding or drilling attachment for a disc cultivator, said attachment including a seed delivery nozzle, so mounted adjacent the inner face of the inner disc of one of the disc gangs that it can be adjusted vertically, laterally and angularly.

With these and other objects in view, my invention consists in the construction, arrangement and combination of the various parts of my device, whereby the objects contemplated are attained, as hereinafter more fully set forth, pointed out in my claims and illustrated in the accompanying drawings, in which:

Fig. 1 is a perspective view of portions of a cultivator, viewed from the rear and shown in dotted lines, my attachment being illustrated in full lines attached thereto.

Fig. 2 is a transverse sectional view through the cultivator axle shaft and the hopper of the attachment, taken on the line 2—2 of Fig. 1.

Fig. 3 is a longitudinal sectional view of the same, taken on the line 3—3 of Fig. 2.

Fig. 4 is a detail view illustrating the mounting of the seed delivery nozzle.

Fig. 5 is a detail sectional view, taken on the line 5—5 of Fig. 1.

Fig. 6 is a diagrammatic view illustrating the relative positions of the discs, seed nozzle and corn row in the operation of my device.

Before proceeding with a detailed description of my structure, I will give a brief explanation of the advantages of drilling a forage crop directly in the rows of the partially matured cereal crop.

Double planting has been observed in many ways in the effort to obtain more intensive cultivation of farm lands, and has been accomplished in various ways. The most common is to lay by the first crop with a final cultivation and then to replant between the rows with the original planter.

It is obviously an advantage to replant simultaneously with the cultivating operation since one operation is thus eliminated. It is a further advantage to replant directly in the rows since by doing so the cereal crop and the forage crop may be harvested in one operation, the stalks of the forage crop being so intertwined with those of the taller plants of the original growth as to be readily secured by a corn binder or the like.

For instance, soy beans, sudan grass, or any of the smaller forage plants may be very successfully reaped by a corn binder when growing in the rows of corn stalks. Since soy beans and sudan grass mature in a much shorter period than corn, the later planting obtains a uniform quality as fodder in both the first and second crops.

My invention is therefore particularly directed to the replanting directly in the original rows, or as close thereto as the growing crop will permit.

To this end I find that by using a disc cultivator together with a planting nozzle, positioned adjacent the inner face of the inner disc, that the nozzle may be used which will dig a furrow of its own, and that the disc will close this furrow behind the nozzle when adjusted to the proper angle.

I have used the reference character 10 to indicate the transverse axle shaft of a cultivator, which shaft is provided with a downwardly extending crank arm, 11, terminating in an axle, 12, upon which is journaled the wheel, 13. Portions of the frame have been shown, including a tongue arch 14, which is braced to the axle, 12, by means of a brace, 15, and secured thereto by means of a bolt, 16.

The cultivator further includes a disk frame including an arch, 17, from which is supported one of the gangs of discs, 18, by means of a U-shaped bracket, 19. The connection between the arch, 17, and the cultivator frame is not illustrated, but it will be understood that the parts are of the ordinary construction.

My attachment includes a hopper which I will refer to in a general way by the reference character A, and which includes a pair of side members, 20, preferably of cast metal and provided at their lower extremities with sockets, 21, shaped to fit the axle shaft, 10. Clamps, 22, are secured to the lower edges of the sides, 20, and encircle the shaft, 10, to secure the hopper thereto.

In order to prevent tipping of the hopper relative to the shaft, 10, I provide a brace rod, 23, secured at one end to the bolt, 16, and at its other end to a bracket, 24, fastened to the forward side, 25, of the hopper. The sides, 25, are held in place between the ends, 20, by means of a bolt, 26. The brace rod, 23, is adjustably mounted in the bracket, 24, by means of nuts, 27, threaded onto the threaded end, 28, of the rod.

Secured to the bottom, 29, of the hopper is a seed cup, 30. The squared operating shaft, 31, is journaled in the side, 20, remote from the wall, 13, and extends through a slot, 31ª, in the other side member, 20, and to a point beyond the outer extremity of the axle shaft, 10, where it is supported by a bracket, 32, which will be described more in detail later.

A fluted delivery cylinder, 33, is slidably mounted on the squared shaft, 31, with the cup, 30, and is rotated thereby in the direction of the arrow, 34, to deliver seed from the cup through the opening, 35, into the funnel, 36, of a conducting tube, 37. These parts are of usual grain drill construction, as is also the sliding gate, 38, which regulates the amount of seed delivered from the hopper. The gate, 38, is adjustable longitudinally upon the shaft, 31, by means of a lever, 39, pivoted at 40 to the rear side, 25, of the hopper and having a bifurcated arm, 41, extending under the bottom of the hopper and engaging the sectional channeled portion, 42, of the gate, 38. A notched sector, 43, engages the lever, 39, to retain it in any of its adjusted positions.

On the further end of the shaft, 31, is secured a trunnion, 44, upon which is journaled a sprocket, 45, having the crown ratchet teeth, 46.

A clutch element, 47, is secured to the shaft, 31, and has crown ratchet teeth, 48, interengaging with the teeth, 46. A link, 49, is journaled in an annular slot, 50, in the clutch element, 47, and has a projecting stud, 51, which receives the end of a link, 52, linked at its other end to a control lever, 53. The lever, 53, is locked in either of its two positions by a keeper, 54.

A drive sprocket, 55, is secured to the wheel, 13, by means of U-bolts, 56, passed through any of the series of the openings, 57, and engaging the spokes, 58, of the wheel. A chain, 59, travels between the sprockets, 55 and 45. The tension of the chain serves to urge the teeth, 46, of the sprocket into engagement with the clutch member, 47, when it is in the position shown in Fig. 1. By moving the lever, 53, to the left, to the other side of the keeper, 54, the clutch member, 47, will slide upon the shaft, 31, to a position where the clutch teeth will be disengaged. The sprocket, 45, will be maintained in exact alignment with the sprocket, 55, by the tension of the chain, and thus will not follow the clutch member, 47. Consequently, when the lever, 53, is moved to its left position, the sprocket, 45, will be allowed to rotate without rotating the shaft, 31.

However, when the cultivator is being backed, it is undesirable to have the shaft, 31, rotate, since the seed would be delivered by rotation of the cylinder, 33, in either direction, and it is only when the cultivator is progressing forwardly that it is desired to deliver the seed.

A spring, 53ª, is interposed between a washer, 53ᵇ, secured to the rod, 52, and a loop. 53ᶜ, on the lever, 53. The rod, 52, has a flattened, slotted portion, 53ᵈ, sliding in the loop, 53ᶜ, and on a pin 53ᵉ, which is received through the slot of the portion, 53ᵈ. When backing, the inclined faces of the teeth, 46 and 48, will force the clutch member away from engagement with the sprocket and the consequent movement of the rod, 52, will be taken up by the spring, 53ª.

The bracket, 32, has the bearing head, 60, which surrounds a trunnion, 61, on the shaft, 31, and is held against displacement longitudinally of the shaft, 31, by means of collars, 62, secured to the shaft. The bracket, 32, serves not only to support the shaft, 31, together with the bearing of the side members, 20, of the hopper, but serves the further function of tightening the chain, 59. To this end I secure the bracket, 32, to the crank arm, 11, by means of a U-shaped bolt clamp, 63, embracing the crank arm and the bracket.

It will now be seen that the bracket, 32, may be slid vertically upon the crank arm and secured in any of its vertically adjusted positions by tightening the clamps, 63. The bearing in the side, 20, allows sufficient play of the shaft, 31, to take care of this slight change in inclination.

To the lower end of the conducting tube, 37, is secured the seed delivery nozzle, 66, preferably of hollow cast construction and having a pointed lower end, 67, which is open at the rear as at 68 to allow the seeds to escape.

The pointed end, 67, or digging point of the nozzle is adapted to enter the earth near the forward edge of the inner disc, 18, as shown in Fig. 6. In order to adjust the nozzle to meet the adjustment of the disc, 18, I provide the following supporting mechanism.

An L-shaped supporting arm comprises a bar, 69, having a depending arm, 70, provided with transverse slots, 71. Screw bolts or the like, 72, are passed through the slots, 71, and threaded into openings (not shown) in the nozzle, 66. The slots, 71, are spaced equi-distant and the screw bolts, 72, are spaced so as to be received in any of several pairs of slots whereby the height of the nozzle may be adjusted. At the same time, the slots being elongated, it will be seen that the nozzle, 66, may assume any of several angular positions in the plane of the supporting member.

The nozzle may be adjusted bodily laterally of the cultivator by shifting the bar, 69. To this end I provide a horseshoe shaped stop member, 73, which is secured to the bar, 69, by a bolt, 74, extending through any of several openings, 75, in the bar, 69. U-bolt clamps, 76, encircle the bracket, 19, at the upper corners thereof and the bar, 69, and stop member, 73. The legs of the stop member prevent longitudinal movement of the bar, 69, relative to the bracket, 19, since these legs are engaged against the U-bolt clamps, 76.

Although I have shown, for the purpose of better illustration, the supporting member in Fig. 1 as being secured to the rear face of the bracket, 19, it will be preferably secured to the forward face thereof by simply reversing the arrangement of the three elements, 79, 73 and 19, in which position the legs of the stop member, 73, will be engaged against the legs of the bracket, 19, so as to prevent twisting movement of the bar, 69, due to pressure against the lower end of the nozzle, 66, in a rearward direction.

The digging point, 67, provides a furrow for the seed dropped through the opening, 68, and the inner disc, 18, being properly adjusted to the angular position shown in Fig. 6 will close the furrow behind the nozzle.

The nearness which may be obtained in planting the seed adjacent the rows of standing corn is only limited by the distance necessary to prevent uprooting of the corn, and it will be seen that since the nozzle is supported on the inner side of the disc, which, in the ordinary cultivator approaches within a few inches of the row of corn when the discs are in position for laying by the corn by throwing the dirt inwardly, that the proper depth and nearness may be obtained.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. In a seeding attachment for a cultivator having a transverse axle shaft and a longitudinal frame member, a hopper having end members provided with sockets adapted to receive the cultivator axle shaft, clamps for securing the end members in engagement with said shaft, a bracket secured to the hopper, a brace secured to said bracket and having a portion extended through an arm of the bracket, said portion being threaded and nuts threaded upon said portion on either side of the arm to provide for a longitudinal adjustment of the brace relative to the bracket, said brace being secured to said frame member at a point spaced from the shaft, to maintain the hopper in rigid relation to the shaft.

2. In a seeding attachment for a disc cultivator and having discs supported by a disc bracket, a seed delivery nozzle having a digging point, and means for mounting said nozzle on the disc bracket, said means comprising a bar having a depending arm supporting the nozzle, a stop member attachable to the bar in any of several positions spaced longitudinally thereof, and conforming to the shape of the bracket, and clamps encircling the bar, the stop member, and the bracket.

3. In a seeding attachment for a disc cultivator and having discs supported by a disc bracket, a seed delivery nozzle having a digging point, and means for mounting said nozzle on the disc bracket, said means comprising a bar having a depending arm provided with a plurality of transverse slots, and screws received in said slots and threaded into the nozzle to support the same in any of several vertical and varied angular positions.

4. A seeding attachment for a cultivator having a plurality of discs adapted to throw soil in one direction including a seed-delivering nozzle having a digging point, said nozzle being mounted between the inner disc and the row to be cultivated, said nozzle being positioned closely adjacent said inner disc and forwardly of the center thereof whereby to cut its own furrow and to have said furrow covered by the inner disc.

Signed at Sioux City, in the county of Woodbury and State of Iowa, this 6th day of March, 1926.

WILLIAM ROHLFSEN.